United States Patent [19]

Lausberg et al.

[11] Patent Number: 4,940,745

[45] Date of Patent: Jul. 10, 1990

[54] GLASS FIBER REINFORCED FLAMEPROOFED THERMOPLASTIC MOLDING COMPOSITIONS BASED ON POLYESTERS AND GRAFT POLYMERS

[75] Inventors: Dietrich Lausberg; Peter Ittemann, both of Ludwigshafen; Graham E. McKee, Weinheim; Karl Schlichting, Bobenheim-Roxheim; Manfred Knoll, Wachenheim; Erhard Seiler, Ludwigshafen, all of Fed. Rep. of Germany

[73] Assignee: BASF Aktiengesellschaft, Ludwigshafen, Fed. Rep. of Germany

[21] Appl. No.: 255,160

[22] Filed: Oct. 7, 1988

[30] Foreign Application Priority Data

Oct. 7, 1987 [DE] Fed. Rep. of Germany ....... 3733840

[51] Int. Cl.$^5$ ................................................ C08K 7/14
[52] U.S. Cl. .................................... 524/504; 523/435; 523/436; 524/411; 524/412
[58] Field of Search ................. 523/435, 436; 524/504, 524/411, 412; 525/64, 65

[56] References Cited

U.S. PATENT DOCUMENTS

| | | | |
|---|---|---|---|
| 3,671,487 | 6/1972 | Abolins | 260/873 |
| 4,145,331 | 3/1979 | Sterzel et al. | 524/504 |
| 4,344,878 | 8/1982 | Dolce | 524/409 |
| 4,666,972 | 5/1987 | Kohler et al. | 525/64 |
| 4,731,405 | 3/1988 | Kirsch et al. | 524/504 |

FOREIGN PATENT DOCUMENTS 2615071 10/1976 Fed. Rep. of Germany .
2758497 5/1986 Fed. Rep. of Germany .

*Primary Examiner*—Lewis T. Jacobs
*Attorney, Agent, or Firm*—Oblon, Spivak, McClelland, Maier & Neustadt

[57] ABSTRACT

The flameproofing agent content of molding compositions containing polyesters ($a_1$), acrylate graft polymers ($a_2$), styrene/acrylonitrile copolymers ($a_3$) and glass fibers can be reduced without affecting the flame resistance by adding finely divided PTFE.

3 Claims, No Drawings

GLASS FIBER REINFORCED FLAMEPROOFED THERMOPLASTIC MOLDING COMPOSITIONS BASED ON POLYESTERS AND GRAFT POLYMERS

The present invention relates to flameproofed thermoplastic molding compositions containing as essential components (A) from 45 to 90 % by weight of a mixture of
  (a$_1$) from 50 to 80 % by weight of a polyester
  (a$_2$) from 10 to 25 % by weight of a graft polymer built up from
    (a$_{21}$) from 50 to 90 % by weight of a grafting base comprising an elastomeric polymer based on
      (a$_{211}$) from 95 to 99.9 % by weight of a C$_2$–C$_{10}$-alkyl acrylate and
      (a$_{212}$) from 0.1 to 5 % by weight of a polyfunctional monomer having at least two olefinic, non-conjugated double bonds
    (a$_{22}$) from 10 to 50 % by weight of a graft surface comprising
      a$_{221}$) from 20 to 90 % by weight of styrene or substituted styrene of the general formula I

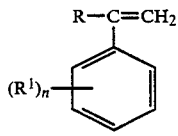

where R is alkyl of from 1 to 8 carbon atoms, hydrogen or halogen, R$^1$ is alkyl of from 1 to 8 carbon atoms or halogen, and n is 0, 1, 2 or 3, or a mixture thereof, and
      (a$_{222}$) from 10 to 80 % by weight of acrylonitrile or methacrylonitrile or a mixture thereof and
  (a$_3$) from 10 to 25 % by weight of a copolymer of
    (a$_{31}$) from 50 to 90 % by weight of styrene or substituted styrene of the general formula I or of mixtures thereof and
    (a$_{32}$) from 10 to 50 % by weight of acrylonitrile or methacrylonitrile or a mixture thereof,
(B) from 4 to 30 % by weight of a flameproofing agent
(C) from 0 to 15 % by weight of a synergistic compound of a metal of the fifth main group of the periodic table
(D) from 0.01 to 3 % by weight of a fluorine-containing ethylene polymer present in homogeneous distribution in the molding composition and having a number average particle diameter of from 0.05 to 10 μm and in addition
(E) up to 20 % by weight of a polymeric component having carboxyl, carboxyl derivative, hydroxyl or epoxy groups and
(F) from 5 to 50 % by weight of glass fibers.

The present invention also relates to the use of such molding compositions for producing moldings and the moldings obtainable from the molding compositions according to the invention as essential components. DE-B-2,758,497 describes thermoplastic molding compositions based on polyesters and modified styrene/acrylonitrile (SAN) copolymers using as modifying agents acrylic esters and/or α-methylstyrene. In the examples, ASA polymers are used as modified SAN polymers. If the modified SAN polymer is a main component in these compositions, films are producible therefrom with advantage. The mechanical properties, however, are still not fully satisfactory as a rule, in particular as regards the impact resistance and bending strength. Nothing is said about the fire properties of the compositions. US-A-3,671,487 discloses glass fiber reinforced polyester molding compositions containing a flameproofing agent and a small amount, preferably from 0.5 to 2.5 % by weight, of polytetrafluoroethylene (PTFE). According to column 5 line 75 to column 6 line 4, it is advantageous to use the PTFE in the form of relatively large particles, since this is said to lead to better results than the use of particles of from 0.05 to 0.5 μm in diameter. These molding compositions do not have totally satisfactory dripping properties at low PTFE concentrations, in particular below 0.5 % by weight.

US-A-4,344,878 describes glass fiber free molding compositions based on polyesters, flameproofing agents and PTFE. The PTFE described as preferred is, as with the abovementioned U.S. Pat. No. 3,671,487, Teflon-6 from DuPont, ie. a PTFE having a large particle size. For this reason these molding compositions too suffer from the same defect as the products described in US-A-3,671,487.

DE-A-2,615,071 describes a process for preparing a thermoplastic polyester molding composition wherein a polyester is mixed with flameproofing agents and an aqueous PTFE dispersion and subsequently melted. Here too there are no indications concerning the importance of the particle size of the PTFE in the end product. Moreover, the process can in certain circumstances be prone to problems with the homogeneous incorporation of the PTFE into the polyester.

The compositions described in these publications do not contain any copolymers of the SAN type (component a$_3$) and therefore, in the production of moldings, are prone to severe warpage and molding shrinkage.

It is an object of the present invention to provide flameproofed thermoplastic molding compositions based on polyesters and graft polymers free of the above-described disadvantages More particularly, they are to have a satisfactory long-term stability in respect of the mechanical properties at elevated temperatures and good impact strength values and a low level of warpage and a good surface $structure in respect of the molding produced from the molding compositions.

We have found that this object is achieved by means of the thermoplastic molding compositions defined at the beginning.

As component A, the molding compositions according to the invention contain from 45 to 90, in particular from 45 to 80, and particularly preferably from 50 to 55, % by weight of a mixture of
  (a$_1$) from 50 to 80 % by weight of a polyester
  (a$_2$) from 10 to 25 % by weight of a graft polymer and
  (a$_3$) from 10 to 25 % by weight of a styrene/(meth)acrylonitrile copolymer.

The polyesters (a$_1$) contained in the molding compositions according to the invention are known per se. Preference is given to using polyesters which contain an aromatic ring in the main chain. The aromatic ring may also be substituted, for example by halogens, such as chlorine and bromine, and/or by C$_1$–C$_4$-alkyl groups, for example methyl, ethyl, i- or n-propyl and i-, n- or t-butyl.

The polyesters may be prepared by reacting dicarboxylic acids, esters thereof or other ester-forming derivatives thereof with dihydroxy compounds in a conventional manner.

Suitable dicarboxylic acids are for example aliphatic and aromatic dicarboxylic acids, which may also be used mixed. Examples thereof are naphthalenedicarboxylic acids, terephthalic acid, isophthalic acid, adipic acid, azelaic acid, sebacic acid, dodecanedioic acid and cyclohexanedicarboxylic acids, mixtures of these carboxylic acids and ester-forming derivatives thereof.

The dihydroxy compounds used are preferably diols of from 2 to 6 carbon atoms, particularly preferably ethylene glycol, 1,4-butanediol, 1,4-butenediol and 1,6-hexanediol; but it is also possible to use 1,4-hexanediol, 1,4-cyclohexanediol, 1,4-di(hydroxymethyl)cyclohexane, bisphenol A, neopentylglycol, mixtures of these diols and ester-forming derivatives thereof.

Polyesters of terephthalic acid and a $C_2$–$C_6$–diol component, eg. polyethylene terephthalate or polybutylene terephthalate or mixtures thereof, are particularly preferred.

The relative viscosity $\eta_{spec}/c$ of the polyesters, measured in 0.5 % strength by weight solution in a phenol-/o-dichlorobenzene mixture (weight ratio 3:2) at 25° C., is in general within the range from 1.2 to 1.8 dl/g.

The proportion of polyester ($a_1$) in component A is from 50 to 80, preferably from 50 to 75, in particular from 50 to 70, % by weight, based on the total weight of components ($a_1$)(+$a_2$)(+$a_3$).

The graft polymer ($a_2$), which accounts for from 10 to 25, in particular from 12 to 25, particularly preferably from 12 to 20, % by weight of component A is built up from ($a_{21}$) from 50 to 90 % by weight of a grafting base based on ($a_{211}$) from 95 to 99.9 % by weight of a $C_2$–$C_{10}$–alkyl acrylate and ($a_{212}$) from 0.1 to 5 % by weight of a difunctional monomer having two olefinic, non-conjugated double bonds and ($a_{22}$) from 10 to 50 % by weight of a graft surface comprising ($a_{221}$) from 20 to 90 % by weight of styrene or substituted styrene of the general formula I or a mixture thereof and $a_{222}$) from 10 to 80 % by weight of acrylonitrile, methacrylonitrile, acrylic esters or methacrylic esters or a mixture thereof.

The component ($a_{21}$) is an elastomer having a glass transition temperature of below −20° C., in particular below −30° C.

To prepare the elastomer, the main monomer ($a_{211}$) comprises an ester of acrylic acid of from 2 to 10 carbon atoms, in particular of from 4 to 8 carbon atoms. Particularly preferred monomers here are tert-, iso- and n-butyl acrylate and also 2-ethylhexyl acrylate, of which the last two are particularly preferred.

These esters of acrylic acid are used together with from 0.1 to 5, in particular from 1 to 4, % by weight, based on the total weight of ($a_{211}$)+($a_{212}$), of a polyfunctional monomer having at least two olefinic, non-conjugated double bonds. Of these, difunctional compounds, ie. those having two non-conjugated double bonds, are preferred Examples thereof are divinylbenzene, diallyl fumarate, diallyl phthalate, triallyl cyanurate, triallyl isocyanurate, tricyclodecenyl acrylate and dihydrocyclopentadienyl acrylate, of which the last two are particularly preferred.

Processes for preparing the grafting base ($a_{21}$) are known per se and described for example in DE-B-1,260,135. Corresponding products are also commercially available.

A particularly advantageous option in some cases is the preparation by emulsion polymerization.

The exact polymerization conditions, in particular the type, the rate of metering and the amount of the emulsifier, are preferably chosen in such a way that the latex of the acrylic ester, which is at least partially crosslinked, has an average particle size (weight average $d_{50}$) within the range from about 200 to 700, in particular from 250 to 600, nm. Preferably, the latex has a narrow particle size distribution, ie. the ratio $$Q = \frac{d_{90} - d_{10}}{d_{50}}$$

is preferably less than 0.5, in particular less than 0.35.

The proportion of grafting base ($a_{21}$) in graft polymer ($a_2$) is from 50 to 90, preferably from 55 to 85, in particular from 60 to 80, % by weight, based on the total weight of ($a_2$).

The grafting base ($a_{21}$) has been grafted with a graft sheath ($a_{22}$) which is obtainable by copolymerization of ($a_{221}$) from 20 to 90, preferably from 30 to 90, in particular from 30 to 80, % by weight of styrene or substituted styrene of the general formula I

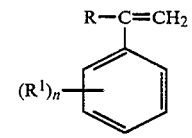

where R is alkyl of from 1 to 8 carbon atoms, hydrogen or halogen and R1 is alkyl of from 1 to 8 carbon atoms or halogen, and n is 0, 1, 2 or 3, and ($a_{222}$) from 10 to 80, preferably from 10 to 70, in particular from 20 to 70, % by weight of acrylonitrile, methacrylonitrile, acrylic esters or methacrylic esters or a mixture thereof.

Examples of substituted styrenes are α-methylstyrene, p-methylstyrene, p-chlorostyrene and p-chloro-α-methylstyrene, of which styrene and α-methylstyrene are preferred.

Preferred acrylic and methacrylic esters are those whose homopolymers or copolymers with the other monomers of component ($a_{222}$) have glass transition temperatures of more than 20° C.; in principle, however, it is also possible to use other acrylic esters, preferably in such amounts that component ($a_{22}$) has as a whole a glass transition temperature Tg above 20° C.

Particular preference is given to esters of acrylic or methacrylic acid with $C_1$–$C_8$–alcohols and epoxy-containing esters such as glycidyl acrylate and glycidyl methacrylate. Very particularly preferred examples are methyl methacrylate, t-butyl methacrylate, glycidyl methacrylate and n-butyl acrylate, the last preferably not being used in an overly high proportion on account of its tendency to form polymers having a very low Tg.

The graft sheath ($a_{22}$) may be prepared in one or more, preferably two or three, steps, which have no effect on the overall composition.

Preferably, the graft sheath is prepared in emulsion as described for example in German Patent 1,260,135 and German Laid-Open Applications DOS 3,227,555, DOS 3,149,357 and DOS 3,414,118.

Depending on the conditions chosen, the graft copolymerization gives rise to a certain proportion of free copolymers of styrene or substituted styrene derivatives and (meth)acrylonitrile or (meth)acrylic esters.

The graft copolymer ($a_{21}+a_{22}$) has in general an average particle size of from 100 to 1,000 nm, in particular of from 200 to 700 nm (d50 weight average). The conditions for preparing the elastomer ($a_{21}$) and for the grafting are therefore preferably chosen so as to produce particle sizes within this range. Measures to this end are known and described for example in German Patent 1,260,135, German Laid-Open Application DOS 2,826,925 and J. Appl. Polym, Sci. 9 (1965), 2929-38. Enlarging the particle size of the latex of elastomer may be accomplished for example by means of agglomeration.

For the purposes of the present invention the graft polymer $a_2$ also includes the free, non-grafted homopolymers and copolymers which form in the course of the graft copolymerization for preparing component ($a_{22}$).

In what follows, some preferred graft polymers are specified:

($a_2/1$: 60 % by weight of grafting base ($a_{21}$) from
($a_{211}$) 98 % by weight of n-butyl acrylate and
($a_{212}$) 2 % by weight of dihydrodicyclopentadienyl acrylate and
40 % by weight of graft sheath ($a_{22}$) from
($a_{221}$) 75 % by weight of styrene and
($a_{222}$) 25 % by weight of acrylonitrile $a_2/2$: grafting base as in the case of $a_2/1$, together with 5 % by weight of a first graft sheath of styrene and 35 % by weight of a second graft stage of
($a_{221}$) 75 % by weight of styrene and
($a_{222}$) 25 % by weight of acrylonitrile
$a_3/2$: grafting base as in ($a_2/1$, together with 13 % by weight of a first graft stage of styrene and 27 % by weight of a second graft stage from styrene and acrylonitrile in a weight ratio of 3:1.

Component ($a_3$) in the molding compositions according to the invention comprises from 10 to 25, preferably from 12 to 20, % by weight of a copolymer of ($a_{31}$) from 50 to 90, preferably from 55 to 90, in particular from 65 to 85, % by weight of styrene and/or substituted styrene of the general formula I and ($a_{32}$) from 10 to 50, preferably from 10 to 45, in particular from 15 to 35, % by weight of acrylonitrile and/or methacrylonitrile.

Components of this type may be prepared for example by the process described in German Published Applications DAS 1,001,001 and DAS 1,003,436. Such copolymers are also commercially available. Preferably, the weight average molecular weight determined by light scattering is within the range from 50,000 to 500,000, in particular from 100,000 to 250,000.

The weight ratio of $a_2:a_3$ is within the range from 1:2.5 to 2.5:1, preferably from 1:2 to 2:1, in particular from 1:1.5 to 1.5:1.

The proportion of flameproofing agent (B) is from 4 to 30, preferably from 7 to 25, % by weight, based on the total weight of the molding compositions. The amount used depends on the nature of the flameproofing agent; in general, for halogen-containing flameproofing agents the total halogen content should be from 3 to 10 % by weight. If red phosphorus is used, the amount is in general from 2 to 10 % by weight; phosphorus-containing organic compound$ are used in corresponding amounts so as to produce a similar phosphorus content.

The flameproofing agents B comprise a known group of chemical compounds. In general, the more important of these compounds contain chemical elements used on account of their ability to confer flame resistance, such as bromine, chlorine, antimony, phosphorus and nitrogen.

The usable halogen-containing compounds include those of the following formula:

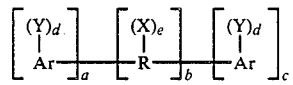

where R is $C_1-C_{10}$-alkylene, alkylidene or a cycloaliphatic group, such as methylene, ethylene, propylene, isopropylene, isopropylidene, butylene, isobutylene, amylene, cyclohexylene or cyclopentylidene, an ether-, carbonyl-, amino- or sulfur-containing group, such as sulfide, sulfoxide or sulfone, or a phosphorus-containing group. R may also consist of two or more alkylene or alkylidene groups which are linked by an aromatic amino, ether, carbonyl, sulfide, sulfoxide, sulfone or phosphoruscontaining group.

Ar and Ar' are identical or different mono- or polycarbocyclic aromatic groups, such as phenylene, biphenylene, terphenylene and naphthylene.

Y is selected from organic, inorganic and organometallic radicals. The substituents represented by Y comprise:
1. halogen, such as chlorine, bromine, iodine or fluorine, or
2. ether groups of the general formula OE where E is X-like, monovalent hydrocarbon or
3. monovalent hydrocarbon groups of the type represented by R or
4. other substituents, such as nitro and cyano, these substituents being essentially inert, provided that at least one and preferably two halogen atoms are present per aryl nucleus.

X is a monovalent hydrocarbon group, comprising for example the following radicals: $C_1-C_{10}$-alkyl, such as methyl, ethyl, propyl, isopropyl, butyl or decyl, aryl, such as phenyl, naphthyl, biphenyl, xylyl or tolyl, aralkyl, such as benzyl or ethylphenyl, cycloalkyl, such as cyclopentyl and cyclohexyl, and also such as monovalent hydrocarbon groups which have inert substituents. If a plurality of substituents X are present, they may be identical or different The parameter d is an integer from 1 to the maximum equivalent of replaceable hydrogens on the aromatic rings Ar and Ar'. The parameter e is an integer from 0 to the number of replaceable hydrogens on the substituents R. The parameters a, b and c are integers including 0. If b is not 0, neither a nor c may be 0. If b is equal to 0, the aromatic groups are linked with one another by direct hydrocarbon-hydrocarbon bonds.

The substituents Y on the aromatic groups Ar and Ar' may be in the ortho, meta or para position.

The scope of the above formula includes biphenyls, of which the following are examples:

2,2-bis(3,5-dichlorophenyl)propane, bis(2-chlorophenyl)methane, bis(2,6-dibromophenyl)methane, 1,1-bis(4-iodophenyl)ethane, 1,2-bis(2,6-dichlorophenyl)ethane, 1,1-bis(2-chloro-4-iodophenyl)ethane, 1,1-bis(2-chloro-4methylphenyl)ethane, 1,1-bis(3,5-dichlorophenyl)ethane, 2,2-bis(3-phenyl-4-bromophenyl)ethane, 2,6-bis(4,6-dichloronaphthyl)propane, 2,2-bis(2,6-dichlorophenyl)pentane, 2,2-bis(3,5-dichlorophenyl)hexane, bis(4-chlorophenyl)phenylmethane, bis(3,5-dichlorophenyl)cyclohexylmethane, bis(3-nitro-4- bromophenyl)methane, bis(4-hydroxy-2,6-dichloro-3-methoxyphenyl)methane, 2,2-bis(3,5-dichloro-4-hydroxyphenyl)propane and 2,2-bis(3-bromo-4-hydroxyphenyl)propane.

Further compounds which fall within the above formula are 2,2'-dichlorobiphenyl, 2,4'-dichloro- or 2,4'-dibromo-biphenyl, hexa-, octa- or decabromobiphenyl and halogenated diphenyl ethers, in particular octabromo- 6r decabromo-diphenyl ether.

The preparation of these and other usable biphenyls is known. The place of the divalent aliphatic group present in the above examples may also be taken by a sulfide group, a sulfoxy group or another similar group.

Preferred phosphorus compounds are elemental phosphorus or organic phosphoric acid, phosphonates, phosphinates, phosphonites, phosphinites, phosphine oxides, phosphines, phosphites or phosphates. An example is triphenylphosphine oxide. It can be used alone or mixed with hexabromobenzene or a chlorinated biphenyl and, facultatively, antimony oxide.

Typical of the preferred phosphorus compounds which may be used in the present invention are those of the following general formula:

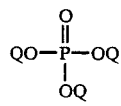

where Q represents identical or different radicals, including hydrocarbyls, such as alkyl, cycloalkyl, aryl, alkyl-substituted aryl and aryl-substituted alkyl, and also halogen, hydrogen and combinations thereof, provided at least one of the radicals represented by Q is aryl. Examples of such suitable phosphates are for example the following: phenyl bisdodecyl phosphate, phenyl bisneopentyl phosphate, phenyl ethylene hydrogen phosphate, phenyl bis(3,5,5'-trimethylhexyl) phosphate, ethyl diphenyl phosphate, 2-ethylhexyl di(p-tolyl) phosphate, diphenyl hydrogen phosphate, bis(2-ethyhexyl) phenyl phosphate, tri(nonylphenyl) phosphate, phenyl methyl hydrogen phosphate, di(dodecyl) p-tolyl phosphate, tricresyl phosphate, triphenyl phosphate, dibutyl phenyl phosphate and diphenyl hydrogen phosphate. The preferred phosphates are those where each Q i$ aryl. The most preferred phosphate is triphenyl phosphate. Preference is further given to the combination of triphenyl phosphate with hexabromobenzene and antimony trioxide.

Suitable flameproofing agents are also those compounds which contain phosphorus-nitrogen bonds, such as phosphonitrile chloride, phosphoric ester amides, phosphoric amides, phosphonamides, phosphimamides, tris(aziridinyl)phosphine oxide or tetrakis(hydroxymethyl)phosphonium chloride. These flame-retardant additives are commercially available.

Further halogen-containing flameproofing agents are tetrabromobenzene, hexachlorobenzene and hexabromobenzene and also halogenated polystyrenes or polyphenylene ethers in the form they are commercially available.

It is also possible to use the halogenated phthalimides described in DE-A-1,946,924. Of these, in particular N,N'-ethylenebistetrabromophthalimide, which is commercially available under the name Saytex BT 93, has become important.

Finally, examples of phosphorus-free halogencontaining flameproofing agents also include brominated oligocarbonates of the general formula

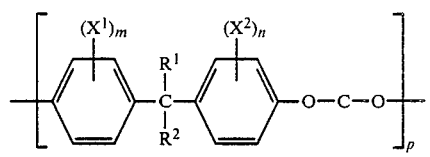

where $R^1$ and $R^2$ are each hydrogen, $C_1$–$C_4$-alkyl or aryl, $X^1$ and $X^2$ are each chlorine or bromine, m and n are each 1, 2, 3 or 4, and p is within the range from 2 to 20.

These oligomeric additives show low volatility even at above 200° C.

Component C in the molding composition according to the invention comprises from 0 to 15 % by weight, preferably from 3 to 12 % by weight, of a synergistic compound of a metal of the fifth main group of the periodic table. An example i$ antimony trioxide, which is particularly preferred.

The fluorine-containing ethylene polymers D, which are present in the molding composition in homogeneous distribution, are polymers of ethylene having a fluorine content of from about 55 to 76 % by weight, preferably from 70 to 76 % by weight. Examples thereof are polytetrafluoroethylene (PTFE), tetrafluoroethylene-hexafluoroethylene copolymers and tetrafluoroethylene copolymers with minor proportions (in general up to 50 % by weight) of copolymerizable ethylenically unsaturated monomers. They are described for example by Schildknecht in Vinyl and Related Polymers, Wiley, 1952, pages 484 to 494, and by Wall in Fluoro Polymers (Wiley Interscience, 1972). The essential requirement is that the component D is present in the molding composition in homogeneous distribution and has a number average particle size $d_{50}$ within the range from 0.05 to 10, preferably from 0.1 to 5, μm. These small particle sizes are particularly preferably obtainable using aqueous dispersions of fluorine-containing ethylene polymers and incorporating them into a polyester melt. This will be described in more detail below. The proportion of component D is from 0.01 to 3, preferably from 0.1 to 2.0, % by weight, based on the total weight of the molding composition.

Component E in the molding compositions according to the invention comprises up to 20, preferably from 1 to 15, in particular from 2 to 12, % by weight of a polymer component having carboxyl, carboxyl derivative, hydroxyl or epoxy groups.

In principle, it is possible to use any kind of polymer in which the carboxyl, hydroxyl or epoxy groups are essentially freely available.

In what follows, some particularly preferred examples of such functional polymers are described in more detail.

The first group to be mentioned here comprises elastomeric polymers having epoxy and/or carboxyl groups at the surface.

It is essential for this aspect of the invention that the adhesion-promoting epoxy and/or carboxyl groups are present at the surface and that the gel content is not less than 50 %.

The epoxy and/or carboxyl groups presumably act as adhesion promoters between the polyester (a₁) and the graft polymer (a₂). Whether this adhesion promotion is due to the formation of covalent chemical bonds or due to physical interactions (van der Waals, dipole-dipole, etc.), is not as yet decidable.

Preference is given to using emulsion-polymerized graft polymers having glass transition temperatures below 0° C. and gel contents of more than 50 %.

The high gel content of the elastomeric polymer brings about an improvement in the mechanical properties and in the surface quality of the molding compositions. The high gel content also brings about that the fluency of polymers (E) is only very low, so that frequently no melt flow index is determinable under standard conditions. On the contrary, the polymers show elastic properties, reacting to the action of a deforming force with an elastic restoring force (cf. B. Vollmert, Grundriss der makromolekularen Chemie, vl. IV, p. 85 ff, E. Vollmert, Verlag Karlsruhe 1979).

Owing to their preparation in emulsion, the particles of component (E) are present in the form of crosslinked dispersion particles.

The elastomeric graft polymers which have been built up from a rubber prepared in emulsion and having a glass transition temperature of below 0° C. and which have epoxy or carboxyl groups at the surface may be prepared by emulsion polymerization in a conventional manner as described for example in Houben-Weyl, Methoden der organischen Chemie, volume XII.I (1961). The usable emulsifers and catalysts are known per se.

Merely representative examples of monomers for preparing the rubber are acrylates such as n-butyl acrylateand 2-ethylhexyl acrylate, methacrylates, and also butadiene and isoprene. These monomers may also be copolymerized with other monomers, eg. styrene, acrylonitrile and vinyl ethers.

Monomers which are capable of bringing about a coupling to component (A) are those which contain epoxy and/or carboxyl groups. Examples of such monomers are glycidyl methacrylate, glycidyl acrylate, allyl glycidyl ether, vinyl glycidyl ether and glycidyl itaconate, and also acrylic acid, methacrylic acid and their metal, in particular alkali metal, salts and ammonium salts, maleic acid, maleic anhydride, metal salts of the acid monoethyl ester of maleic acid, fumaric acid, monoethyl fumarate, itaconic acid, vinylbenzoic acid, vinylphthalic acid, salts of monoethyl fumarate, monoesters of maleic acid, fumaric acid and itaconic acid with alcohols ROH where R has up to 29 carbon atoms, eg. methyl, propyl, isopropyl, butyl, isobutyl, hexyl, cyclohexyl, octyl, 2-ethylhexyl, decyl, stearyl, methoxyethyl, ethoxyethyl and hydroxyethyl.

Although maleic anhydride and metal salts (in particular alkali metal and alkaline earth metal salts) of polymerizable carboxylic acids have no free carboxyl groups, they behave so similarly to the free acids that, for the purposes of the present invention, they shall be encompassed here under the generic term carboxyl-containing monomers.

The emulsion-polymerized graft (or dispersion) polymers can be of the multi-shell type, the core and the outer shell being identical, for example, except that the outer shell contains additional groups which make possible an adhesion to component (A). Examples thereof are an inner core of n-butyl acrylate and an outer shell of n-butyl acrylate and glycidyl methacrylate, or an inner core of butadiene and an outer shell of butadiene and glycidyl methacrylate. However, the core and the shell may also have different structures, comprising for example an inner core of butadiene and an outer shell of n-butyl acrylate and glycidyl methacrylate.

Of course, the rubber can also have a homogeneous structure, for example of the single-shell type comprising a copolymer of n-butyl acrylate and glycidyl methacrylate or butadiene and glycidyl methacrylate.

The rubber particles may also be crosslinked. Suitable crosslinking monomers are for example butadiene, divinylbenzene, diallyl phthalate and dihydrodicyclopentadienyl acrylate. The proportion of these crosslinkers in component (E) is preferably below 5 % by weight, based on (E).

Further examples of component (E) are copolymers built up from styrene and/or substituted styrenes of the general formula I and epoxy or lactam group containing monomers.

The proportion of styrene and/or substituted styrene in component B is generally within the range from 50 to 99.9 % by weight, preferably from 70 to 95 % by weight.

It is of course also possible to use mixtures of different substituted styrenes or mixtures of styrene and substituted styrenes, and this may frequently even be advantageous.

By using monomers containing epoxy or lactam groups in the polymerization of styrene and/or substituted styrene it is possible to prepare the components E according to the invention which are derived from styrene polymers.

Of monomers which contain epoxy groups

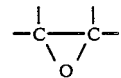

those containing a plurality of epoxy groups are preferred. In principle, any epoxy-containing monomer is suitable, as long as it is certain that after the reaction the epoxy group is present in the free form.

It is to be noted that the introduction of free epoxy groups into polymer E is also possible by epoxidating polymers from the monomers using epoxidants.

The proportion of epoxy-containing monomer is from 0.1 to 30 % by weight, preferably from 0.5 to 20 % by weight, particularly preferably from 1 to 10 % by weight, based on component (E).

Merely representative examples of epoxy-containing monomers are glycidyl-containing monomers, eg. vinyl glycidyl ether, allyl glycidyl ether and (meth)acrylates containing glycidyl groups, in particular glycidyl acrylate and glycidyl methacrylate.

Preferred components (E) derived from styrene polymers having epoxy groups are for example copolymers of (E₁) from 90 to 99 % by weight of styrene, α-methylstyrene and/or p-methylstyrene (E₂) from 1 to 10 % by weight of glydicyl (meth)acrylate or (E₁) from 50 to 91 % by weight of styrene, α-methylstyrene and/or p-methylstyrene (E₂) from 1 to 10 % by weight of glycidyl (meth)acrylate (E₃) from 8 to 40 % by weight of acrylonitrile and/or methacrylonitrile.

A second group of suitable monomers are monomers containing lactam groups.

They contain a lactam group of the general formula

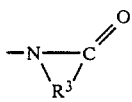

where $R^3$ s a branched or linear alkylene of from 2 to 15 carbon atoms.

Merely representative examples thereof are β-propiolactams (azetidin-2-ones) of the general formula

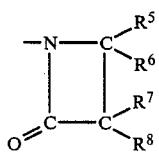

where the substituents $R^5$ to $R^8$ may each be alkyl of from 1 to 6 carbon atoms or hydrogen. They are described by R. Graf in Angew. Chem. 74 (1962), 523–530, and H. Bastian in Angew. Chem. 80 (1968), 304–312. Examples thereof are 3,3'-dimethyl-3-propiolactam, 2-pyrrolidone

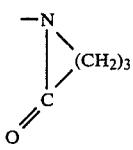

ε-caprolactam

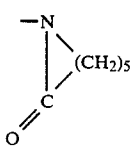

7-enantholactam, 8-capryllactam and 12-laurolactam, as also described by H. Dachs, Angew. Chemie 74 (1962), 540–45.

Of these, 2-pyrrolidones and ε-caprolactams are particularly preferred.

Preferably, the lactam groups as in

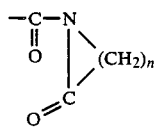

are incorporated in the corresponding monomers via a carbonyl group on the nitrogen.

A particularly preferred example thereof is N-(meth)acryloyl-ε-caprolactam

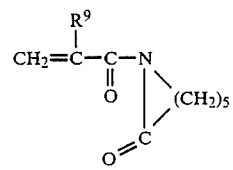

where $R^9$ is hydrogen or methyl.

The proportion of monomers having lactam groups in the component B is from 0.1 to 30 % by weight, preferably from 0.1 to 5 % by weight, based on component (E).

As a result, component (E) can have for example the following compositions:

($E_1$) from 95 to 99.9 % by weight of styrene, α-methylstyrene and/or p-methylstyrene ($E_2$) from 0.1 to 5 % by weight of N-(meth)acryloyl-ε-caprolactam or, if monomers $E_3$ are present, ($E_1$) from 55 to 91 % by weight of styrene, α-methylstyrene and/or p-methylstyrene ($E_2$) from 0.1 to 5 % by weight of N-(meth)acryloyl-ε-caprolactam ($E_3$) from 8 to 40 % by weight of (meth)acrylonitrile.

Suitable polymeric components containing hydroxyl groups are in principle all polymers having hydroxyl groups which are essentially freely available.

A first group of particularly suitable polymers of this type comprises polycondensates of aliphatic or aromatic diols or more highly polyhydric alcohols with epihalohydrins. Such compounds and processes for their preparation are known per se to those skilled in the art, making further details here superfluous. Merely representative examples are polycondensates of epihalohydrins and dihydroxy compounds which may also be used for preparing polycarbonates and which have turned out to be particularly advantageous. But also suitable are in principle other, in particular aliphatic, diols or more highly polyhydric aromatic or aliphatic alcohols.

Preference is given to using, because of its easy availability, a polycondensate of bisphenol A and epichlorohydrin of the structure

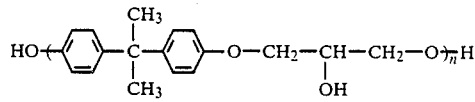

which is commercially available under the name Phenoxy ®.

Aside from using polymers already having the hydroxyl group in the main chain it is also possible to use polymers or copolymers which receive these functional groups through the use of suitable monomers in the polymerization, in which case the groups can then likewise be present in the polymers in the main chain or, alternatively, in substituents on the main chain. A further option comprises the grafting of suitable OH-containing monomers onto grafting bases, a suitable grafting base being in principle any polymer not completely incompatible with components ($a_1$), ($a_2$) and ($a_3$). A certain degree of incompatibility can be compensated for by increasing the proportion of hydroxyl groups.

Suitable components (E) are therefore for example polymers based on polyolefins, polystyrene and rubber elastomers having hydroxyl groups —OH obtainable either by using suitable comonomers or, alternatively, by grafting with functional groups —OH. The proportion of comonomers or grafting monomers having hydroxyl groups —OH is dependent on the compatibility of the base polymer of component (E) with component (A). The better the compatibility is, the lower the proportion of OH groups can be. It follows from the aforesaid that a large number of polymeric compounds are suitable for use as component (E), of which in what follows only particularly preferred types are described in more detail by way of example.

The first group comprises polymers of vinylphenylcarbinols and copolymers of the aforementioned base polymers containing up to 100 mol % of vinylphenylcarbinols, of which vinylphenyldimethylcarbinols and in particular vinylphenylhexafluorodimethylcarbinol have proved to be particularly suitable. A suitable base polymer or grafting base again advantageously comprises any of the aforementioned types of polymers.

The second group consists of polymers based on vinylphenols and copolymers of the aforementioned base polymers with vinylphenols which may also contain substituents in the nucleus. Substituents which increase the acidity of the phenolic hydrogen are particularly suitable, such as halogen substituents, but also other electron-withdrawing substituents.

Besides these it is also possible in principle to use polymers and copolymers based on any polymerizable or graftable alcohol.

A component (E) incorporating hydroxyl groups may be prepared in a conventional polycondensation, graft polymerization or copolymerization process, which is why no further details are necessary here.

A suitable component (E) may also be an olefin polymer which contains epoxy groups. The epoxy groups may be incorporated into the olefin polymer by copolymerization or graft polymerization with epoxy-carrying copolymerizable monomers or by epoxidation of a reactive olefin polymer. Advantageously, these olefin polymers are built up from 0.1 to 50 % by weight, in particular from 0.5 to 10 % by weight, of monomers having epoxy groups.

Preference is given to copolymers of not less than 50, in particular not less than 60, % by weight of one or more olefins of from 2 to 10 carbon atoms which also contain at least one copolymerizable monomer having epoxy groups with or without further copolymerizable monomers.

Preferred olefins in such copolymers are ethylene, propylene, 1-butene, isobutylene, 1-pentene, 1-hexene, 1-heptene, 1-octene or mixtures thereof, preferably ethylene and propylene.

Preferred epoxy-carrying monomers are ethers of the general formula

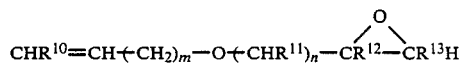

where m is an integer from 0 to 20, n is an integer from 1 to 10 and $R^{10}, R^{11}, R^{12}$ and $R^{13}$ are each H or an alkyl of from 1 to 8 carbon atoms.

Preferably, m is 0 or 1, n is 1, and $R^1, R^2$ and $R^3$ are each H.

Preferred compounds are allyl glycidyl ether and vinyl glycidyl ether. Further epoxy-carrying monomers are epoxy-carrying olefins of the general formula

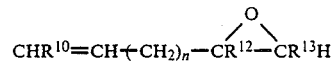

where m, $R^{12}, R^{13}$ and $R^{14}$ are each as defined in the preceding formula; preferably n is from 1 to 5, $R^{10}$ is H or methyl and $R^{12}$ and $R^{13}$ are each H, methyl or ethyl.

Particular preference is given to epoxy-carrying esters of acrylic acid or methacrylic acid. Particular industrial importance has been obtained by glycidyl acrylate and glycidyl methacrylate.

Preferred olefin polymers are built up from
(a) from 50 to 90 % by weight of olefins of from 2 to 10 carbon atoms, preferably ethylene,
(b) from 1 to 50 % by weight of glycidyl acrylate and/or glycidyl methacrylate and optionally
(c) from 1 to 49 % by weight of at least one other copolymerizable monomer, with components a, b and c always adding up to 100 % by weight.

The glass transition temperature of the olefin polymer is preferably below 0° C., particularly preferably below −20° C. Preferred copolymerizable monomers are (meth)acrylates, vinyl esters, vinyl ethers and methylbutenol. Examples are methyl (meth)acrylate, ethyl (meth)-acrylate, propyl (meth)acrylate and butyl (meth)acrylate, particular preference being given to n-butyl acrylate and 2-ethylhexyl acrylate.

Particularly preferred olefin polymers are built up from
(a) from 50 to 98 % by weight of ethylene
(b) from 1 to 40 % by weight of glycidyl (meth)acrylate and
(c) from 1 to 45 % by weight of n-butyl acrylate and/or 2-ethylhexyl acrylate, and particularly proven olefin polymers from
(a) from 60 to 95 % by weight of ethylene
(b) from 3 to 20 % by weight of glycidyl (meth)acrylate
(c) from 10 to 35 % by weight of n-butyl acrylate and/or 2-ethylhexyl acrylate.

The olefin polymers may be prepared by any desired method, such as random copolymerization, block copolymerization and graft copolymerization.

Preference is given to random copolymerization under high pressure and at elevated temperatures. The polymers are in general of high molecular weight and have a melt flow index (190/2.16, DIN 53,735) of from 1 to 80.

Besides the aforementioned olefin copolymers it is also possible to use products which contain carboxyl groups or derivatives thereof, which are extensively described for example in EP-A-106,027, reference being made thereto for further details.

The last group of examples of component E) according to the invention comprises styrene polymers with carboxylic acids and/or functional derivatives thereof.

These are built up in detail from
from 20 to 95 % by weight of styrene and/or substituted styrene of the general formula I,
from 0 to 40 % by weight of a primary and/or secondary alkyl ester of acrylic acid or methacrylic acid having
from 1 to 8 carbon atoms in the alcohol moiety, acrylonitrile and/or methacrylonitrile,
from 1 to 30 % by weight of a polymerizable carboxylic acid and/or a tertiary ester thereof and/or an anhydride of a polymerizable carboxylic acid of from 1 to 20 carbon atoms.

Of the tertiary esters of carboxylic acids, esters of acrylic and methacrylic acid, in particular tert-butyl acrylate, are preferred. A merely representative example of an anhydride is maleic anhydride; acids are acrylic acid, maleic acid and fumaric acid.

Representative examples of this group are copolymers of styrene and maleic anhydride which may additionally contain acrylonitrile and/or primary or secondary alkyl acrylates.

Of the aforementioned functional polymers suitable for use as component (E), polymers containing OH groups, in particular the polycondensate of epichlorohydrin and bisphenol A, styrene/acrylonitrile/maleic anhydride copolymers, styrene/glycidyl methacrylate copolymers and olefin copolymers having epoxy groups are particularly preferred (cf. also the Examples).

Component F in the molding compositions according to the invention comprises from 5 to 50, in particular from 7 to 45, particularly preferably from 8 to 40, % by weight, based on the total weight of the molding composition, of glass fibers. They are commercially available products.

In the molding composition, these glass fibers generally have an average length of from 0.1 to 0.5 mm, preferably from 0.1 to 0.4 mm, and a diameter within the range from 6 to 20 $\mu$m. Particular preference is given to glass fibers made of E-glass. To obtain better adhesion, the glass fibers may have been coated with organosilanes, epoxysilanes or other polymer coatings.

Aside from components (A) to (F), the molding compositions according to the invention may contain customary additives and processing aids.

Customary additives are for example stabilizers and oxidation retarders, agents against thermal decomposition and decomposition by ultraviolet light, lubricants and mold release agents, colorants, such as dyes and pigments, pulverulent fillers and reinforcing agents and plasticizers. Such additives are used in the customary active amounts.

The stabilizers may be added to the thermoplastic compositions at any stage of processing. Preferably, the stabilizers are added early on in order to prevent the onset of decomposition before the composition has been protected. Such stabilizers have to be compatible with the composition.

The oxidation retarders and heat stabilizers which may be added to the thermoplastic compositions according to the invention include those which are generally added to polymers, such as halides or metals of group I of the periodic table, eg. sodium halides, potassium halides or lithium halides in conjunction with copper(I) halides, for example chloride, bromide or iodide. Further suitable stabilizers are sterically hindered phenols, hydroquinones, various substituted representatives of this group and combinations thereof in concentrations up to 1 % by weight, based on the weight of the mixture.

Suitable UV stabilizers are likewise those which are generally added to polymers in amounts of up to 2.0 % by weight, based on the total weight of the mixture. Examples of UV stabilizers are various substituted resorcinols, salicylates, benzotriazoles, benzophenones and the like.

Suitable lubricants and mold release agents, added for example in amounts of up to 1 % by weight to the thermoplastic composition, are stearic acids, stearyl alcohol, stearic esters and stearic amides.

It is also possible to add organic dyes such as nigrosine, pigments, for example titanium dioxide, cadmium sulfide, cadmium sulfide/selenide, phthalocyanines, ultramarine blue and carbon black.

It is also possible to employ nucleating agents, such as talc, calcium fluoride, sodium phenylphosphinate or aluminum oxide, in amounts of for example up to 5 % by weight, based on the composition. Plasticizers, such as dioctyl phthalate, dibenzyl phthalate, butyl benzyl phthalate, hydrocarbon oils, N-(n-butyl)benzenesulfonamide, o- and p-tolueneethylsulfonamide, are advantageously added in amounts of up to about 20 % by weight, based on the molding composition. Colorants such as dyes and pigments may be added in amounts of up to about 5 % by weight, based on the molding composition.

The molding compositions according to the invention can be prepared by mixing components A to D and F and, if to be used, E in a conventional mixing apparatus, care being taken to ensure that the fluorine-containing ethylene polymer has an appropriate particle size and becomes homogeneously distributed in the molding composition.

It has been found to be particularly advantageous to use component D in the form of an aqueous dispersion having a solids content of from 5 to 50, in particular from 10 to 50, % by weight and to mix this dispersion into a melt of polyester A.

This can take place before or after the addition of the remaining components B, C, F and, if to be used, E.

In some cases it is found to be advantageous to prepare a concentrated batch of PTFE-containing polyester and thereafter to mix it with the other components in the melt.

The PTFE is preferably incorporated in an extruder, at from 240° to 330° C., in particular at from 240° to 300° C. The water liberated in the course of the mixing in the extruder can be removed via devolatilizing means on the extruder.

After mixing on the extruder the compositions can be further processed in a conventional manner, for example into moldings and films.

The compositions according to the invention are notable for good flame retardancy and do not drip even if the proportion of PTFE or fluorine-containing ethylene polymer is low.

In addition, they can be prepared in a simple and technically safe manner without fear of health risks.

EXAMPLES

Preparation of a polytetrafluoroethylene/polybutylene terephthalate batch

98 % by weight of polybutylene terephthalate (PBTP, Ultradur B 4500 from BASF AG) having a relative viscosity of 1.6, determined on a 0.5 % strength by weight solution in 1:1 phenol/o-dichlorobenzene at 25° C., was melted in a ZSK 53 extruder from Werner und Pfleiderer. Into the polymer melt was pumped 2 % by weight of polytetrafluoroethylene (based on the solids content in the dispersion) in the form of an aqueus dispersion. The Teflon ® dispersion was of the type 30 N from DuPont and prior to pumping was diluted with water to a solids content of 10 % by weight.

The water was evaporated off in the course of extrusion. The extruder temperature was set to 270° C., the speed of rotation to 250 revolutions per minute and the throughput to 50 kg/h.

After extrusion, the polymer extrudate was cooled, granulated and dried.

The number average particle size of the PTFE in the dispersion was within the range from 0.25 to 5 μm.
Preparation of molding compositions The following components were used:

($a_1$) polybutylene terephthalate having a viscosity number, determined in accordance with German Standard Specification DIN 53,728 Part 3, of 108

($a_2$) graft polymer of 58.5 % by weight of n-butyl acrylate
grafting base
   1.2 % by weight of dihydrodicyclopentadienyl acrylate
30 % by weight of styrene
graft sheath
   10 % by weight of acrylonitrile
prepared by the process described in German Laid-Open Application DOS 2,444,584

($a_3$) styrene/acrylonitrile copolymer of 65 % by weight of styrene and 35 % by weight of acrylonitrile having a viscosity number of 80, measured in DMF, 0.5 % strength at 25° C.

$B_1$ brominated tetrabromobisphenol A/polycarbonate having phenol end groups (BC 52, from Great Lakes)

$B_2$ N,N'-ethylene bis(tetrabromophthalimide) (Saytex BT 93, from Saytech Inc.)

$B_3$ octabromodiphenyl ether $B_4$ decabromodiphenyl ether $B_5$ brominated polystyrene (Pyrocheck 68 PB, from Ferro Chem., bromine content 68 % by weight)

$B_6$ brominated tetrabromobisphenol A/polycarbonate having tribromophenol end groups (BC 58, from Great Lakes)

$B_7$ perbromo 1,4-diphenoxybenzene (BT 120, Ethyl Corporation)

$B_8$ ethylenebisdibromonorbornanedicarboximide (BN 451, Saytech Inc.)

$B_9$ tetrabromophthalic anhydride (RB 49, Saytech Inc.)

$B_{10}$ tetrabromophthalic acid polyether (RB 79, Saytech Inc.)

$B_{11}$ tetrabromobisphenol A (RB 100, Saytech Inc.)

$B_{12}$ 4,4'-di(2,3-dibromopropyloxy)-3,3',5,5'-tetrabromobisphenol A

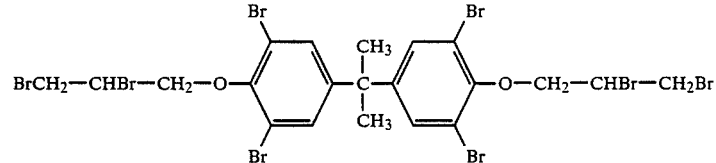

$B_{13}$ poly(2,6-dibromophenylene) oxide (PO 64P, Great Lakes)

$B_{14}$ 1,3-di(tribromophenoxy)propane (FF 680, Great Lakes)

$B_{15}$ brominated epoxy resin based on epichlorohydrin/ tetrabromobisphenol A (F 2,400, from Makhteshim Chemicals)

$B_{16}$ poly(pentabromobenzyl) acrylic ester (FR 1025 from Dead Sea Bromine)

$B_{17}$ 1,2-di(pentabromophenoxy)ethane

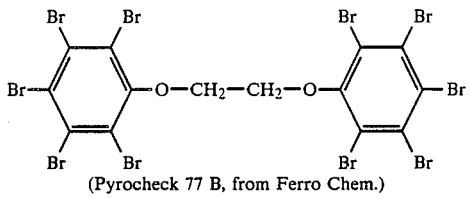

(Pyrocheck 77 B, from Ferro Chem.)

$B_{18}$ hexabromocyclododecane (FR 1026, from Dead Sea Bromine)

$B_{19}$ hexabromobenzene $B_{20}$ brominated polystyrene having a bromine content of 60 % by weight (Pyrocheck 60 PB, from Ferro Chem.)

C: antimony trioxide ($Sb_2O_3$)

E: terpolymer of styrene, acrylonitrile and maleic anhydride (weight ratio 68/22/10) having a viscosity number of 80, measured at 0.5 % strength in dimethylformamide (DMF)

F: glass fibers made of E-glass

Components ($a_1$), ($a_2$), ($a_3$), (B), (D) and (E) were mixed, and melted in an extruder, and (C) and glass fibers (F) were added to the melt via the extruder. The extrusion temperature was 260° C. The compositions were then extruded into a water bath, granulated and dried. Thereafter, without further aftertreatment, test specimens were prepared on an injection molding machine.

The impact strength $a_n$ was determined in accordance with German Standard Specification DIN 53,453. The flammability test was carried out in accordance with UL 94 (Underwriters' Laboratories).

The compositions and the results of the measurements are given in the table below.

Reading this table, it must be borne in mind that the data concerning the PTFE content (column headed (D)) are always based on the pure PTFE content; since the PTFE was used in the form of the above-described batch, the PTFE content does not correspond to the amount of batch added. The column marked D* lists the amounts of batch added to 100 parts by weight of each of the remaining components. The amount of polyester present in batch D* is included within the polyester content given for component ($a_1$).

TABLE

| Example No. | Composition (all amounts in % by weight) | | | | | | | | | Impact strength kj/m² | Classification under UL 94 |
|---|---|---|---|---|---|---|---|---|---|---|---|
| | $a_1$ | $a_2$ | $a_3$ | B | C | D | D* | E | F | | |
| 1(comp.) | 41 | 8 | 9 | 8 $B_{15}$ | 4 | — | — | — | 30 | 32 | HB |

TABLE-continued (all amounts in % by weight)

| Example No. | a1 | a2 | a3 | B | C | D | D* | E | F | Impact strength kj/m² | Classification under UL 94 |
|---|---|---|---|---|---|---|---|---|---|---|---|
| 2(comp.) | 39 | 7 | 9 | 10 $B_{15}$ | 5 | — | — | — | 30 | 29 | V-2 |
| 3(comp.) | 37 | 7 | 8 | 12 $B_{15}$ | 6 | — | — | — | 30 | 27 | V-0 |
| 4 | 42.35 | 7.8 | 8.8 | 7.8 $B_{15}$ | 3.9 | 0.05 | 2.5 | — | 29.3 | 32 | V-0 |
| 5 | 43.75 | 7.6 | 8.6 | 7.6 $B_{15}$ | 3.8 | 0.1 | 5.0 | — | 28.6 | 32 | V-0 |
| 6 | 38.9 | 7.6 | 8.6 | 7.6 $B_{15}$ | 3.8 | 0.1 | 5.0 | 4.8 | 28.6 | 35 | V-0 |
| 7 | 43.7 | 7.6 | 8.6 | 7.6 $B_1$ | 3.8 | 0.1 | 5.0 | — | 28.6 | 34 | V-0 |
| 8 | 44.7 | 7.6 | 8.6 | 6.6 $B_2$ | 3.8 | 0.1 | 5.0 | — | 28.6 | 30 | V-0 |
| 9 | 45.6 | 7.6 | 8.6 | 5.7 $B_3$ | 3.8 | 0.1 | 5.0 | — | 28.6 | 35 | V-0 |
| 10 | 45.6 | 7.6 | 8.6 | 5.7 $B_4$ | 3.8 | 0.1 | 5.0 | — | 28.6 | 35 | V-0 |
| 11 | 44.7 | 7.6 | 8.6 | 6.6 $B_5$ | 3.8 | 0.1 | 5.0 | — | 28.6 | 31 | V-0 |
| 12 | 44.7 | 7.6 | 8.6 | 6.6 $B_6$ | 3.8 | 0.1 | 5.0 | — | 28.6 | 33 | V-0 |
| 13 | 45.6 | 7.6 | 8.6 | 5.7 $B_7$ | 3.8 | 0.1 | 5.0 | — | 28.6 | 35 | V-0 |
| 14 | 43.7 | 7.6 | 8.6 | 7.6 $B_8$ | 3.8 | 0.1 | 5.0 | — | 28.6 | 30 | V-0 |
| 15 | 44.7 | 7.6 | 8.6 | 6.6 $B_9$ | 3.8 | 0.1 | 5.0 | — | 28.6 | 33 | V-0 |
| 16 | 42.7 | 7.6 | 8.6 | 8.6 $B_{10}$ | 3.8 | 0.1 | 5.0 | — | 28.6 | 32 | V-0 |
| 17 | 43.7 | 7.6 | 8.6 | 7.6 $B_{11}$ | 3.8 | 0.1 | 5.0 | — | 28.6 | 36 | V-0 |
| 18 | 44.7 | 7.6 | 8.6 | 6.6 $B_{12}$ | 3.8 | 0.1 | 5.0 | — | 28.6 | 34 | V-0 |
| 19 | 44.7 | 7.6 | 8.6 | 6.6 $B_{13}$ | 3.8 | 0.1 | 5.0 | — | 28.6 | 30 | V-0 |
| 20 | 44.7 | 7.6 | 8.6 | 6.6 $B_{14}$ | 3.8 | 0.1 | 5.0 | — | 28.6 | 32 | V-0 |
| 21 | 43.7 | 7.6 | 8.6 | 7.6 $B_{15}$ | 3.8 | 0.1 | 5.0 | — | 28.6 | 34 | V-0 |
| 22 | 44.7 | 7.6 | 8.6 | 6.6 $B_{16}$ | 3.8 | 0.1 | 5.0 | — | 28.6 | 32 | V-0 |
| 23 | 44.7 | 7.6 | 8.6 | 6.6 $B_{17}$ | 3.8 | 0.1 | 5.0 | — | 28.6 | 35 | V-0 |
| 24 | 44.7 | 7.6 | 8.6 | 6.6 $B_{18}$ | 3.8 | 0.1 | 5.0 | — | 28.6 | 34 | V-0 |
| 25 | 45.6 | 7.6 | 8.6 | 5.7 $B_{19}$ | 3.8 | 0.1 | 5.0 | — | 28.6 | 34 | V-0 |
| 26 | 45.6 | 7.6 | 8.6 | 5.7 $B_{20}$ | 3.8 | 0.1 | 5.0 | — | 28.6 | 31 | V-0 |

We claim:

1. A flameproofed thermoplastic molding composition containing as essential components
   (A) from 45 to 90 % by weight of a mixture of
      ($a_1$) from 50 to 80 % by weight of a polyester
      ($a_2$) from 10 to 25 % by weight of a graft polymer built up from
         ($a_{21}$) from 50 to 90 % by weight of a grafting base comprising an elastomeric polymer based on
            ($a_{211}$) from 95 to 99.9 % by weight of a $C_2$–$C_{10}$–alkyl acrylate and
            ($a_{212}$) from 0.1 to 5 % by weight of a polyfunctional monomer having at least two olefinic, non-conjugated double bonds
         ($a_{22}$) from 10 to 50 % by weight of a graft surface comprising
            ($a_{221}$) from 20 to 90 % by weight of styrene or substituted styrene of the general formula I

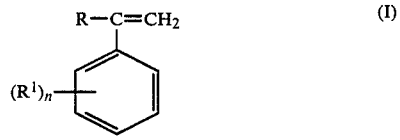

where R is alkyl of from 1 to 8 carbon atoms, hydrogen or halogen, $R^1$ is alkyl of from 1 to 8 carbon atoms or halogen, and n is 0, 1, 2 or 3, or a mixture thereof, and
            ($a_{222}$) from 10 to 80 % by weight of acrylonitrile, methacrylonitrile or a methacrylic ester or a mixture thereof and
      ($a_3$) from 10 to 25 % by weight of a copolymer of
         ($a_{31}$) from 50 to 90 % by weight of styrene or substituted styrene of the general formula I or of mixtures thereof and
         ($a_{32}$) from 10 to 50 % by weight of acrylonitrile or methacrylonitrile or a mixture thereof,
   (B) from 4 to 30 % by weight of a flameproofing agent
   (C) from 0 to 15 % by weight of a synergistic compound of a metal of the fifth main group of the periodic table
   (D) from 0.01 to 3 % by weight of a fluorine-containing ethylene polymer present in homogeneous distribution in the molding composition and having a number average particle diameter of from 0.05 to 10 μm, and in addition
   (E) from 0 to 20 % by weight of a polymeric component having carboxyl, carboxyl derivative, hydroxyl or epoxy groups and
   (F) from 5 to 50 % by weight of glass fibers.

2. A thermoplastic molding composition as claimed in claim 1 having the following contents:
   (A) from 45 to 80 % by weight
   (B) from 7 to 25 % by weight
   (C) from 4 to 12 % by weight
   (D) from 0.05 to 2 % by weight
   (E) from 0 to 12 % by weight
   (F) from 8 to 40 % by weight 3. A process for preparing a flameproofed thermoplastic molding composition as claimed in claim 1 or 2, which comprises mixing the fluorine-containing ethylene polymer (D) in the form of an aqueous dispersion having a solids content of from 10 to 50 % by weight into a melt of polyester ($a_1$) and, before or after the addition of component (D), adding the components $a_2$, $a_3$, C, E and F.

* * * * *